(12) United States Patent
Dichter

(10) Patent No.: US 11,548,636 B2
(45) Date of Patent: Jan. 10, 2023

(54) PASSIVE-RELEASE, SNAP-FIT COUPLING DEVICES FOR SUSPENDED PAYLOAD CONTAINERS OF AIRCRAFTS

(71) Applicant: Aurora Flight Sciences Corporation, a subsidiary of The Boeing Company, Manassas, VA (US)

(72) Inventor: Daniel W. Dichter, Cambridge, MA (US)

(73) Assignee: Aurora Flight Sciences Corporation, a subsidiary of The Boeing Company, Manassas, VA (US)

(*) Notice: Subject to any disclaimer, the term of this patent is extended or adjusted under 35 U.S.C. 154(b) by 364 days.

(21) Appl. No.: 16/896,377

(22) Filed: Jun. 9, 2020

(65) Prior Publication Data

US 2021/0380241 A1    Dec. 9, 2021

(51) Int. Cl.
| | | |
|---|---|---|
| *B64D 1/12* | (2006.01) | |
| *B64D 1/22* | (2006.01) | |
| *B64C 27/08* | (2006.01) | |
| *B64C 39/02* | (2006.01) | |

(52) U.S. Cl.
CPC .............. *B64D 1/12* (2013.01); *B64D 1/22* (2013.01); *B64C 27/08* (2013.01); *B64C 39/024* (2013.01); *B64C 2201/024* (2013.01); *B64C 2201/128* (2013.01)

(58) Field of Classification Search
CPC .............. B64C 39/024; B64C 2201/12; B64C 2201/126; B64D 1/00; B64D 1/02; B64D 1/08; B64D 1/10; B60P 1/64; B60P 1/6409; B66C 1/10; B66C 1/101; B66C 1/38; B66C 1/62
See application file for complete search history.

(56) References Cited

U.S. PATENT DOCUMENTS

| | | |
|---|---|---|
| 3,223,358 A | 12/1965 | Quick |
| 9,346,547 B2 | 5/2016 | Patrick et al. |
| 9,422,139 B1 | 8/2016 | Bialkowski et al. |
| 9,663,245 B2 | 5/2017 | Zhao et al. |
| 9,676,481 B1 | 6/2017 | Buchmueller |
| 9,969,494 B1 | 5/2018 | Buchmueller et al. |
| 2012/0168397 A1 | 7/2012 | Lim et al. |
| 2013/0051782 A1 | 2/2013 | Dimotakis |

(Continued)

*Primary Examiner* — Joshua J Michener
*Assistant Examiner* — Ka Chun Leung
(74) *Attorney, Agent, or Firm* — Quinn IP Law

(57) ABSTRACT

Presented are passive-release, snap-fit coupling devices for attaching cargo to cargo suspension systems, methods for making/using such devices, and aircraft equipped with underbody suspension systems using passive-release, snap-fit coupling devices for securing payloads. An object mounting device is presented for securing an object, such as a cargo container, to a tether hook of a suspension system, such as an aircraft's payload suspension system. The object mounting device includes a base plate that affixes to the object, and a hook latch mounted onto the base plate. The hook latch includes a guide surface adjacent a catch cavity. The catch cavity releasably receives therein the tether hook. The guide surface is oriented at an oblique angle with respect to the base plate in order to slidably engage the tether hook, upon release from the catch cavity and under the force of gravity, to thereby eject the tether hook from the hook latch.

22 Claims, 5 Drawing Sheets

(56) References Cited

U.S. PATENT DOCUMENTS

| | | |
|---|---|---|
| 2015/0331427 A1 | 11/2015 | Chaudary |
| 2017/0106978 A1 | 4/2017 | Sopper et al. |
| 2019/0233254 A1* | 8/2019 | Shin .................. B64D 1/22 |
| 2019/0256210 A1* | 8/2019 | Prager ............... B64C 39/024 |
| 2020/0140237 A1* | 5/2020 | Zlotnik .............. B64D 1/22 |
| 2020/0207471 A1* | 7/2020 | Yasuda .............. B64D 1/12 |

* cited by examiner

PASSIVE-RELEASE, SNAP-FIT COUPLING DEVICES FOR SUSPENDED PAYLOAD CONTAINERS OF AIRCRAFTS

TECHNICAL FIELD

The present disclosure relates generally to payload suspension systems of aircraft. More specifically, aspects of this disclosure relate to systems, methods, and devices for suspending payload containers from airframes of rotary-wing aircraft.

BACKGROUND

Fixed-wing aircraft, such as airplanes and gliders, achieve flight using wings that are immovably attached to the aircraft's airframe and generate aerodynamic lift through a positive angle of attack during forward travel through the air. The wing's airfoil cross-section deflects air downward as the aircraft is propelled forward; this produces a dynamic pressure-gradient on the wing that, in turn, lifts and buoys the airplane during flight. In contrast to conventional fixed-wing aircraft, vertical takeoff and landing (VTOL) aircraft, as the name implies, are capable of vertical takeoffs and landings as well as intermittent hovering flight. The most recognizable example of VTOL aircraft is the helicopter, which is a rotary-wing aircraft (rotorcraft) with engine-driven rotor blades that provide lift and thrust to the aircraft. Tiltwing and tiltrotor aircraft are hybrid-type VTOL that incorporate features of both fixed-wing and rotary-wing vehicles for flight operations.

Many modern-day aircraft—be they fixed-wing, rotary-wing, or hybrids of the two—eliminate the need for an in-vehicle human pilot to operate the aircraft during flight. An unmanned aerial vehicle (UAV), for example, is an aircraft without manual flight controls or a flight deck from which a pilot controls the aircraft. A UAV, or "drone" as it is colloquially known, may operate with various degrees of autonomy, ranging from predominantly manual control to fully autonomous control and therebetween in partially automated flight control architectures. Remote-piloted UAVs are part of an unmanned aircraft system (UAS) that employs a resident computer control system that is wirelessly connected to a land-based ground control station for piloting the aircraft. Handheld UAVs are radio-controlled (RC) aircraft that are smaller than a bookcase and manually operated by a handheld controller. Commercial-class UAVs, in contrast, have built-in control and guidance systems to provision speed control, flight stabilization, and navigation functions.

Conventional aircraft and modern-day UAVs are frequently employed to transport a variety of different payloads to assorted destinations. Many VTOL aircraft, for example, are originally equipped with or retrofitted to include a payload suspension system for quickly and efficiently airlifting payloads. To accommodate such delivery operations, the payload or its container may be specifically designed to easily and safely attach to a drop-down tether cable of a drone's payload suspension system. Alternatively, the VTOL may employ a "universal" payload suspension system designed to accommodate containers of varying shapes and sizes. In either case, the payload container must be suspended in a manner that ensures secure attachment to avoid involuntary jettisoning of the payload, while at the same time minimizing inadvertent load movement and oscillation to ensure aircraft control and maneuverability during flight.

SUMMARY

Presented herein are passive-release, snap-fit coupling devices for cargo suspension systems, methods for making and methods for using such coupling devices, and aircraft equipped with payload suspension systems using passive-release coupling devices for detachably securing the payload container. By way of example, a single-piece or bipartite cargo coupling device is presented that incorporates a hook latch segment for passively coupling to and decoupling from a tether hook, and a base plate segment that detachably affixes to a cargo container. When in use, a cargo container is wrapped with wire (e.g., string, twine, strap, thin-gauged cable, etc.) that converges at the top center of the container; the base plate seats on top of the cargo container, positioned underneath the wire. A cross-shaped pattern of wire channels in the base plate receives therein and retains the wires. The hook latch is then snap-fit onto the base plate, thereby sandwiching the wires between the latch and base. In particular, a square array of cantilevered snap-fit tines project from the base plate and snap lock into complementary snap holes in the hook latch.

To airlift the payload, the hook latch forms a catch cavity within which is secured a tether hook; in so doing, the payload container is attached to a payload suspension system of a VTOL UAV. Upon delivery of the payload, the payload container is lowered onto a support surface; an inclined ramp surface within the hook latch acts as a guide to passively eject the tether hook, under the force of gravity, from the coupling device to thereby unhook the payload container. Specifically, once the tension in the tether cable is reduced sufficiently to allow gravity to lower the tether hook away from the catch cavity, the hook slidably engages this inclined ramp surface, which directs the hook diagonally out of engagement with the hook latch. As gravity continues to pull down on the hook (with little tension on the tether cable), the tether hook misaligns with hook latch and, thus, disengages from the coupling device.

Attendant benefits for at least some of the disclosed concepts include lightweight passive detachment mechanisms for payload delivery that eliminate the need for dedicated actuation/motorized elements to operatively couple/decouple payload containers with the aircraft. This, in turn, helps to minimize the aircraft's all-up weight (AUW) while reducing parts and assembly costs. In addition to mitigating vehicle weight and cost, disclosed cargo coupling devices provision passive payload attachment and detachment, which simplifies and expedites payload delivery. Furthermore, disclosed cargo coupling devices may be readily reused or recycled, require minimal additional packaging space for internally stowed cargo, and allow packaging labels to remain visible.

Aspects of this disclosure are directed to passive-attach, passive-release coupling devices for detachably connecting cargo containers to cargo suspension systems. For instance, an object mounting device is presented for securing an object to a control arm-mounted or cable-mounted tether hook of a suspension system. The object mounting device includes a base plate (also referred to herein as "lower fitting") that affixes to the object, and a hook latch (also referred to herein as "upper fitting") that is mounted onto or integrally formed with the base plate. The hook latch includes a catch cavity and a guide surface adjacent the catch cavity. The hook latch's catch cavity securely receives therein the tether hook to thereby secure the object to the suspension system. The guide surface, which is underneath the catch cavity and oriented at an oblique angle with respect to the base plate, slidably engage the tether hook, upon release from the catch cavity and under the force of gravity, to thereby eject the tether hook from the hook latch. Disclosed mounting devices may be employed in both vehicular and non-vehicular applications alike.

Additional aspects of this disclosure are directed to aircraft equipped with payload suspension systems using passive-attach, passive-release coupling devices for detachably securing payload containers. As used herein, the terms "aircraft" and "vehicle" and permutations thereof may be used interchangeably and synonymously to include any relevant vehicle platform, such as fixed-wing aircraft, rotary-wing aircraft, VTOL aircraft, airships, and UAVs, including manned, unmanned, and fully or partially autonomous variants thereof. In an example, an aircraft includes a load-bearing airframe with landing gear, rotor assemblies and/or wings, optional propulsion and guidance systems, and other standard original equipment. The aircraft is also equipped with a cargo suspension system, which is attached to the airframe and includes a tether cable, hook, and optional winch.

Continuing with the discussion of the foregoing example, the aircraft includes a cargo mounting device for securing a cargo container to the cargo suspension system. The cargo mounting device includes a base plate that affixes, e.g., via wrapping wire, adhesive, fastener, etc., to the cargo container, and a hook latch that mounts, e.g., via snap-fit, living hinge, fastener, etc., onto the base plate. The hook latch includes a catch cavity and a sloped guide surface subjacent the catch cavity. To operatively attach the cargo to the suspension system, the catch cavity releasably receives therein the tether hook. Oriented at an oblique angle with respect to the base plate, the guide surface slidably engages the tether hook, upon release from the catch cavity and under the force of gravity, to thereby eject the tether hook from the hook latch.

Further aspects of this disclosure are directed to methods for making and methods for using any of the disclosed mounting devices, suspension systems, and/or aircraft. For instance, a method is presented for mounting an object to a tether hook of a suspension system. This representative method includes, in any order and in any combination with any of the above and below disclosed options and features: affixing a base plate to the object; mounting a hook latch to the base plate, the hook latch including a catch cavity and a guide surface adjacent the catch cavity, the guide surface being oriented at an oblique angle with respect to the base plate and configured to slidably engage the tether hook; receiving the tether hook in the catch cavity; and releasing the tether hook, under the force of gravity, from the catch cavity such that the tether hook slides down the guide surface, and thereby ejects from the hook latch.

For any of the disclosed systems, methods, devices, and aircraft, the hook latch includes an elongated tower that is mounted onto a support plate. In this instance, the hook latch tower includes an internal pocket that houses therein the catch cavity and the guide surface. The elongated tower may include a back wall, which is adjoined at a proximal (first) end thereof to and projects orthogonally from the support plate, and an arcuate overhang, which projects from a distal (second) end of the back wall, opposite the proximal end. The catch cavity is defined between the arcuate overhang and the back wall. The elongated tower may also include a pair of sidewalls, each of which projects orthogonally from a respective side of the back wall. In this instance, the guide surface is sandwiched between the two sidewalls, projecting obliquely from the back wall to the support plate.

For any of the disclosed systems, methods, devices, and aircraft, the hook latch may be integrally formed as a distinct (first) single-piece, unitary structure. Likewise, the base plate may be integrally formed as a discrete (second) single-piece, unitary structure that is subsequently coupled to the hook latch. For example, the hook latch (or base plate) may include multiple snap apertures, whereas the base plate (or hook latch) includes multiple cantilevered snap-fit tines. Each snap-fit tine snap-locks into a respective one of the snap apertures to thereby mount the hook latch to the base plate. As yet a further option, the hook latch and base plate may be integrally formed together as a one-piece structure, e.g., connected to each other via a living hinge.

For any of the disclosed systems, methods, devices, and aircraft, the object may be a container, such as a cardboard box with a cuboid shape, that is wrapped with wire, such as natural or synthetic twine. In this instance, the base plate includes a bottom (first) surface that seats against the container, a top (second) surface opposite the bottom surface, and one or more wire channels recessed into the top surface. The wire is received in the wire channel(s) to thereby affix the base plate and, thus the mounting device, to the object. Optionally, the base plate may include a pair of recessed wire channels, each of which receives therein and secures a respective segment of the wire. These wire segments may crisscross at an intersecting point; the recessed wire channels may be arranged in a cruciform pattern such that the wire's intersecting point abuts the base plate. The recessed wire channels may intersect at a semispherical central cavity recessed into the base plate; the intersecting point of the crisscrossed wire segments may seat within this central cavity. As yet a further option, each recessed wire channel may have an arcuate, concave shape that extends across the base plate, e.g., from one corner to a diagonally opposite corner.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
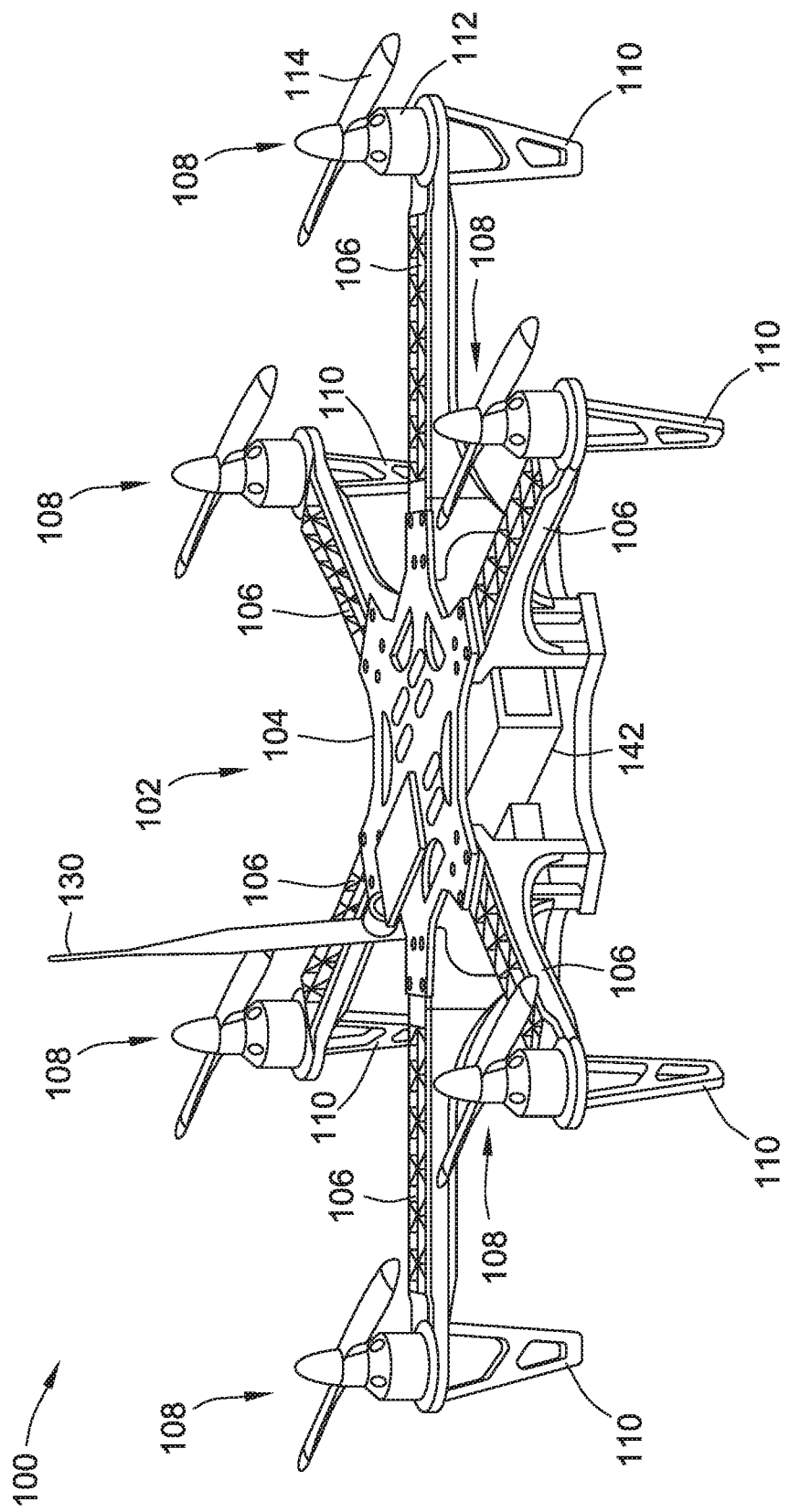
FIG. 1 is an elevated, perspective-view illustration of a representative aircraft with a payload suspension system in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, and Detailed Description sections, but not explicitly set forth in the claims, should not be incorporated into the claims, singly or collectively, by implication, inference or otherwise. Moreover, the drawings discussed herein are not necessarily to scale and are provided purely for instructional purposes. Thus, the specific and relative dimensions shown in the drawings are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, front, back, left, right, etc., may be with respect to an aircraft that is operatively oriented in an upright position on a horizontal support surface.

Referring now to the drawings, wherein like reference numbers refer to like features throughout the several views, there is shown in FIG. 1 a representative aircraft, which is designated generally at 100 and portrayed herein for purposes of discussion as a multi-rotor vertical takeoff and landing unmanned aerial vehicle. The illustrated VTOL aircraft 100—also referred to herein as "vehicle" or "UAV" for brevity—is merely an exemplary application with which aspects and features of this disclosure may be practiced. In the same vein, incorporation of the present concepts into a human-controlled UAV should also be appreciated as an exemplary implementation of the concepts disclosed herein. As such, it will be understood that aspects of the present disclosure may be incorporated into manned and unmanned aerial vehicles, may be implemented for any logically relevant type of aircraft architecture (e.g., fixed-wing, rotary-wing, hybrid VTOL, etc.), and may be utilized in both vehicular and non-vehicular applications alike. Lastly, only select components have been shown and will be described in additional detail herein. Nevertheless, the systems, methods, devices, and aircraft discussed below may include numerous additional and alternative features, and other available peripheral components, for carrying out the various functions of this disclosure.

UAV 100 of FIG. 1 is shown as a cargo drone with a load-bearing airframe 102 that is generally composed of a central fuselage 104 and a circular array of (six) rotor booms 106. The horizontally oriented rotor booms 106 are circumferentially spaced around and extend in a radially outward direction from the fuselage 104. Projecting orthogonally from a terminal end of each boom 106 is a fixed skid-type landing gear 110. These landing gears 110 collectively buttress the UAV 100 when the vehicle is not in use as well as prior to takeoff and after landing operations. Also cantilevered to the fuselage 104 at the terminal ends of the booms 106 are motor-driven rotor assemblies 108. The fuselage 104, rotor booms 106, and landing gears 110 may be integrally formed as a single-piece, unitary structure, or manufactured as separate components that are securely coupled to one another. While a six-rotor (hexarotor) cargo drone is illustrated throughout the figures, the UAV 100 may take on alternative aircraft configurations and size classifications, may employ greater or fewer than six rotors, and may employ various control surfaces and lifting surfaces. In the same vein, the landing gears 110 may be greater or fewer than six, and may take on alternative locations and configurations from that shown in the Figures.

Figure 2:
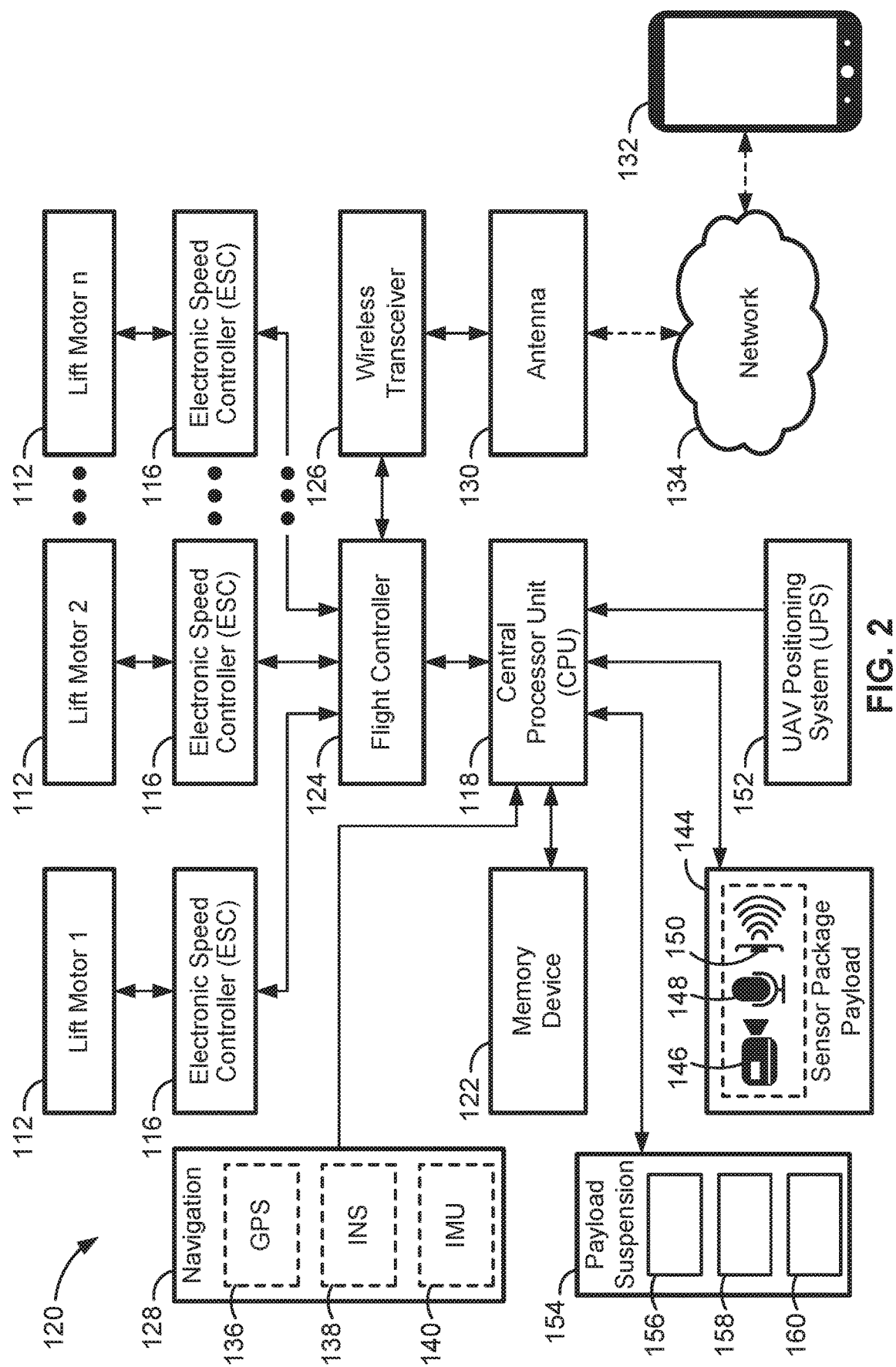
FIG. 2 is a schematic diagram illustrating the aircraft control system architecture of the representative aircraft of FIG. 1.

Rotor assemblies 108 of FIG. 1 may be operated individually, jointly, and in assorted combinations to provide lift and thrust to the UAV 100. Each rotor assembly 108 may be typified by a lift motor 112 that drives a dual-blade propeller assembly 114 mounted at a distal end of a mast shaft (not visible). These hingeless "simple" rotor assemblies 108 are each juxtaposed with a landing gear 110 at the distal end of a rotor boom 106 and vertically oriented to direct thrust forces downward relative to the airframe 102. The lift motors 112 may be embodied as brushless permanent magnet (PM) electric motors controlled via an electronic speed controller (ESC) 116 (FIG. 2). While shown packaged at the distal end of each boom 106, the six lift motors 112 (or a single, shared lift motor) may instead be located on the fuselage 104 of the airframe 102. As a further option, torque generated via a lift motor 112 may be transmitted to one or more propeller assemblies 114 via a gearbox or power-shifted transmission interposed between the motor 112 and propeller(s) 114.

FIG. 2 is a schematic diagram illustrating the architecture of an aircraft control system 120 for governing the vehicle components and associated operations of the UAV 100 of FIG. 1. As illustrated, the UAV 100 includes an aircraft central processing unit (CPU) 118 that is communicatively connected (wired or wirelessly) with a resident memory device 122, a flight controller 124, a wireless communications transceiver 126, and a navigation system 128. Control processor, control module, module, controller, processor unit, processor, and permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc.

Associated memory and storage (e.g., read only, programmable read only, random access, hard drive, tangible, etc.), shown schematically at 122 in FIG. 2, whether resident, remote, or a combination of both, store processor-executable software, firmware programs, routines, etc.

Software, firmware, programs, instructions, routines, code, algorithms, and similar terms may be used interchangeably and synonymously to mean any processor-executable instruction sets, including calibrations and look-up tables. The aircraft CPU 118 may be designed with a set of control routines and logic executed to provide desired functionality. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 120.

With continuing reference to FIG. 2, the wireless communications transceiver 126 is operatively coupled with an antenna 130 to exchange data between the UAV's CPU 118 and a human machine interface (HMI) device 132, such as a smartphone, tablet computer, laptop computer, remote controller, or other control unit (e.g., a base station). As shown, the UAV 100 communicates data with the HMI device 132 over a wireless communications network 134. Network 134 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). In at least some aspects, most if not all data transaction functions carried out by the system 120 may be conducted over a wireless network, such as a wireless local area network (WLAN) or cellular data network, to ensure freedom of movement of the UAV 100 and HMI device 132. The HMI device 132 may facilitate monitoring and control of the UAV 100 and its payload(s).

Aircraft CPU 118 communicates with the ESC 116 via flight controller 124 to regulate operation of the rotor assemblies 108 in response to command signals from an operator, an autopilot system, a navigation system 128, or other system via the wireless transceiver 126. For at least some system architectures, the aircraft's CPU 118, memory device 122, flight controller 124, etc., may be discrete devices or may be integrated into a single component or circuit. In operation, the flight controller 124 dynamically—in real-time or near real-time—adjusts the thrust output from each of the rotor assemblies 108 on each rotor boom 106 during the various stages of flight (e.g., take-off, cruising, landing) via the ESC 116 to control three-dimensional (3D) motion, including vehicle propulsion, lift, roll, pitch, yaw, etc., of the UAV 100. In this regard, the flight controller 124 may be operable to independently and jointly control the individual lift motors 112 and thereby generate a desired lift thrust for each of the rotor assemblies 108. Propeller assembly 114 speed and, thus, rotor assembly 108 output may be controlled by modulating power supplied to each lift motor 112 from a resident rechargeable energy storage system (RESS), represented in FIG. 1 as a lithium-ion (Li-ion) or silicon-based Li-ion battery module 142 (FIG. 1) mounted inside the central fuselage 104.

UAV 100 may be equipped with optional resident (onboard) and/or remote (offboard) hardware to provision fully autonomous or partially automated flight operations. By way of example, the aircraft CPU 118 may communicate with a resident navigation system 128, which is generally composed of a Global Positioning System (GPS) module 136, an Inertial Navigation System (INS) module 138, and an Inertial Measurement Unit (IMU) module 140. IMU module 140 may include one or more gyros, accelerometers, magnetometers, etc., to determine vehicle orientation, angular rate, and g-force. The satellite-based GPS module 136 retrieves real-time geodetic data for the UAV 100, including absolute drift-free position values that may be used to reset an INS solution or may be fused with it by a Kalman Filter or other suitable mathematical technique. The navigation system 128 communicates inertial stabilization, GPS, and navigation data to the aircraft CPU 118, which may be used to facilitate automated and manual operation of the aircraft 100.

As indicated above, the UAV 100 may be scaled and customized for any of a variety of drone classifications. As shown, the UAV 100 of FIGS. 1 and 2 is adapted as a reconnaissance and logistics drone equipped with a sensor package payload 144 that provisions autonomous navigation, guidance, and control of the UAV 100, such as to enable monitoring, data collection, and cargo delivery. For instance, the sensor package payload 144 is generally composed of an optical sensor 146, an audio input/output (I/O) device 148, and other sensor array 150. Optical sensor 146 of FIG. 2 is an optical instrument for capturing and recording images and/or video. By comparison, the audio I/O device 148 is a sound transducer for transmitting and receiving audible data, and may comprise one or more microphones, echolocation sensors, ultrasonic sensing devices, voice recognition hardware/software, etc. Lastly, the sensor array 150 facilitates aircraft functionality and provides attendant data, and may include radar sensing, Doppler sensing, light detection and ranging (LIDAR) sensing, etc. sensor package payload 144 is securely mounted to the airframe 102 and communicates with the aircraft CPU 118, e.g., to assist with UAV navigation, speed, etc. In addition, the sensor package payload 144 may be rotatably and pivotally coupled to, for example, an underside surface of the airframe 102 via a payload-stabilizing gimbal system to enable the sensor package payload 144 to be more easily oriented to monitor objects below and/or on the ground.

As another example of optional vehicle hardware, the aircraft CPU 118 may be operatively coupled with a UAV Positioning System (UPS) module 152 operable for real-time vehicle location, e.g., in scenarios in which GPS is unavailable or failed. The UPS module 152 measures UAV 100 position within an environment based on sensor readings and/or memory-stored navigational maps, which may be retrieved by or loaded and stored to the UAV 100 (e.g., in cache memory of memory device 122). The UPS module 152 may include, or be communicatively coupled with, various sensors, such as motion capture sensors, radio-beacons, infrared sensors, acoustic sensors, etc. In certain aspects, the UPS module 152 may employ sensor data from the sensor package payload 144 to determine the UAV 100 position within a given operating environment.

As a logistics-class drone, the UAV 100 may be equipped with a payload suspension system 154 for selectively loading, airlifting, and discharging cargo, such as a payload container. The illustrated suspension system 154 of FIG. 2 is generally typified by an electric winch 156 that is actively controlled by a servomotor 158 to raise and lower a tether cable 160. A payload may be detachably coupled, as explained below, to an extendable end of the tether cable 160; the electric winch 156 may be driven via the servomotor 158 to wind and unwind the cable 160 and thereby raise and lower the payload for transport and delivery. After the payload is secured to the tether cable 160 using a suitable attachment mechanism, such as a releasable hook, and a payload coupling device, such as those described below with respect to FIGS. 3-5, the UAV 100 may travel by flight to a delivery zone. During flight, the payload's displacement from the airframe 104 may be systematically modulated to minimize load sway and oscillation. When the UAV 100 lands at or hovers above the delivery zone, the tether cable 160 may be extended to thereby lower the payload from the UAV 100; the payload may be automatically or manually released from the payload suspension system 154 at the delivery zone. Alternatively, the payload may be controllably released by the tether cable 160 and thereby jettisoned from the payload suspension system 154 while the UAV 100 is in flight.

Figure 3:
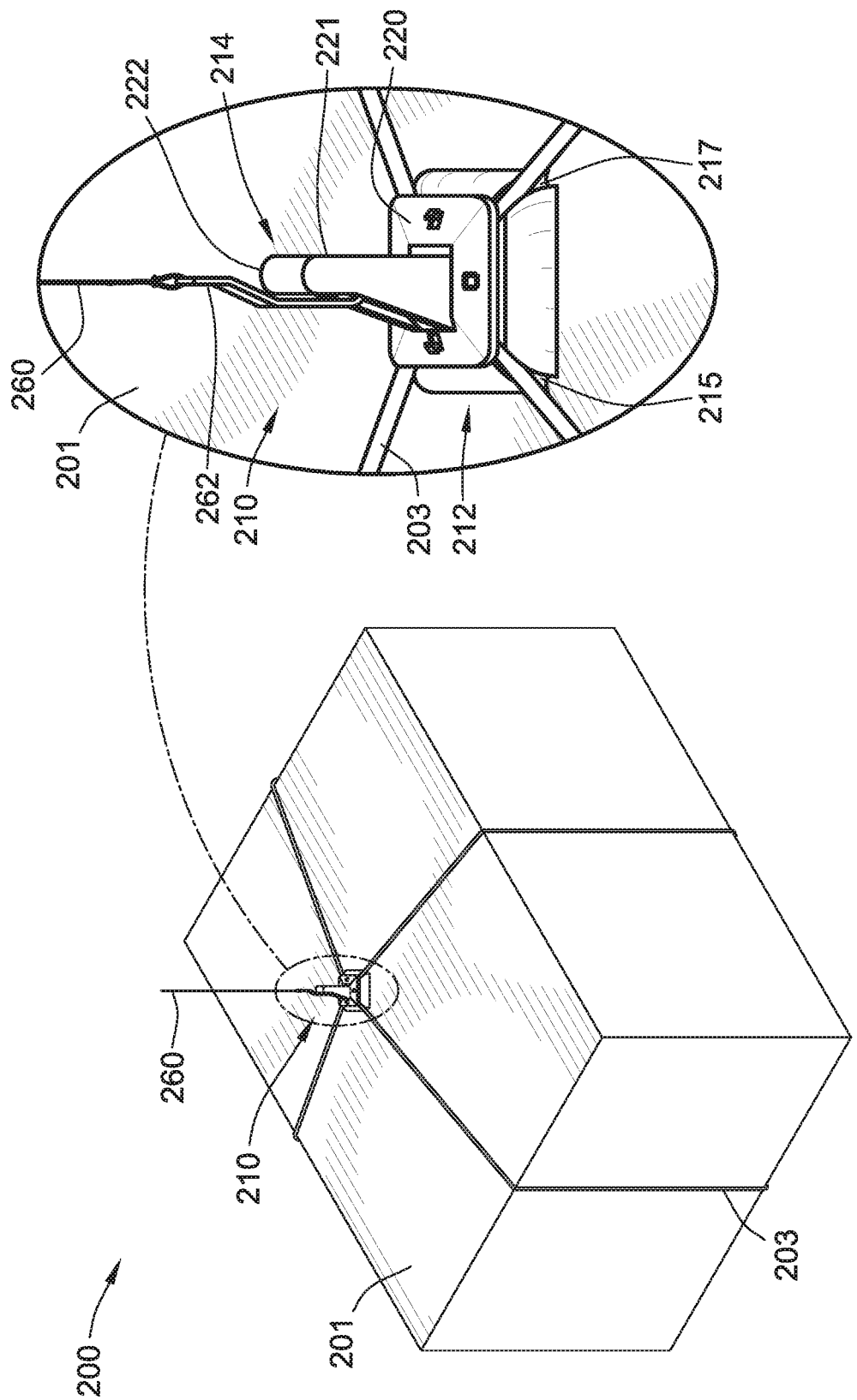
FIG. 3 is an elevated, perspective-view illustration of a representative passive-release, snap-fit coupling device mounting a cargo container to a tether hook of a cargo suspension system in accord with aspects of the disclosed concepts.

Turning next to FIG. 3, there is shown an example of a cargo suspension and mounting (CSM) system, designated generally at 200, for securing a cargo container 201 or other object to an aircraft or an overhead support, such as a crane, gantry, or truss system. In this regard, it is envisioned that the CSM system 200 of FIG. 3 may be utilized by the UAV 100 of FIGS. 1 and 2 for airlifting and delivering a payload; as such, features and options disclosed herein with reference to the payload suspension system 154 may be incorporated, singly or in any combination, into the CSM system 200, and vice versa. As a point of similarity, the cargo suspension and mounting system 200 includes a drop-down tether cable 260 with a bottom-most, distal end to which is secured the cargo container 201. The cargo container 201 may detachably secure to the tether cable 260 via a suitable attachment device, such as a tether hook 262.

To secure the cargo container 201 to the CSM system 200, a cargo mounting device 210 detachably couples the cargo container 201 to the tether cable 260. As best seen in the inset view of FIG. 3 and the exploded view of FIG. 4, the representative cargo mounting device 210 is portrayed as a bipartite construction composed of a base plate 212 segment that detachably affixes to the cargo container 201, and a hook latch 214 segment that detachably affixes to the tether hook 262. While shown in the Figures with a single cargo mounting device 210 located top-center on the container 201 and coupling to a J-shaped, flat-nosed eye hook, it should be appreciated that the CSM system 200 may employ multiple cargo mounting devices 210, may position the cargo mounting device(s) 210 at alternative locations, and/or may employ alternative hook configurations. Moreover, the cargo container 201 is portrayed as a right-rectangular octahedron constructed of single-wall corrugated cardboard; however, the container 201 may take on innumerable alternative shapes, sizes, and materials within the scope of this disclosure.

Hook latch 214 seats on top of and rigidly attaches to the base plate 212. It is envisioned that the cargo mounting device 210—including both the hook latch 214 and base plate 212 segments—may be fabricated as a one-piece construction, e.g., connected via a living hinge or immovably mounted to each other. Alternatively, the cargo mounting device 210 may be a multi-piece construction with discrete parts that are assembled together and securely attached, e.g., via adhesives, rivets, threaded fastener, heat bonding, etc. In accord with the illustrated example, the hook latch 214 is manufactured as a distinct (first) single-piece, unitary structure, and the base plate 212 is manufactured as another distinct (second) single-piece, unitary structure that is mechanically attached to the hook latch 214. Each component may be cast and machined from a metallic material, injection molded or 3D printed from a polymeric material, or cut and compressed or carved from a wood or plant-based material. To securely assemble the cargo mounting device 210, the base plate 212 (or hook latch 214) is formed with multiple snap-fit tines 216; as shown, four cantilevered snap-fit tines 216 are arranged in a quadrantal array, projecting orthogonally upwards from a top surface 213 of the base plate 212. In this regard, the hook latch 214 (or base plate 212) is formed with multiple complementary snap apertures 218; as shown, four snap apertures 218 are arranged in a quadrantal array, extending vertically through a support plate 220 of the hook latch 214. Each snap-fit tine 216 slides through and snap-locks into a respective snap aperture 218; once all four are properly inserted, the tines 216 cooperatively mount the hook latch 214 onto the base plate 212.

Figure 4:
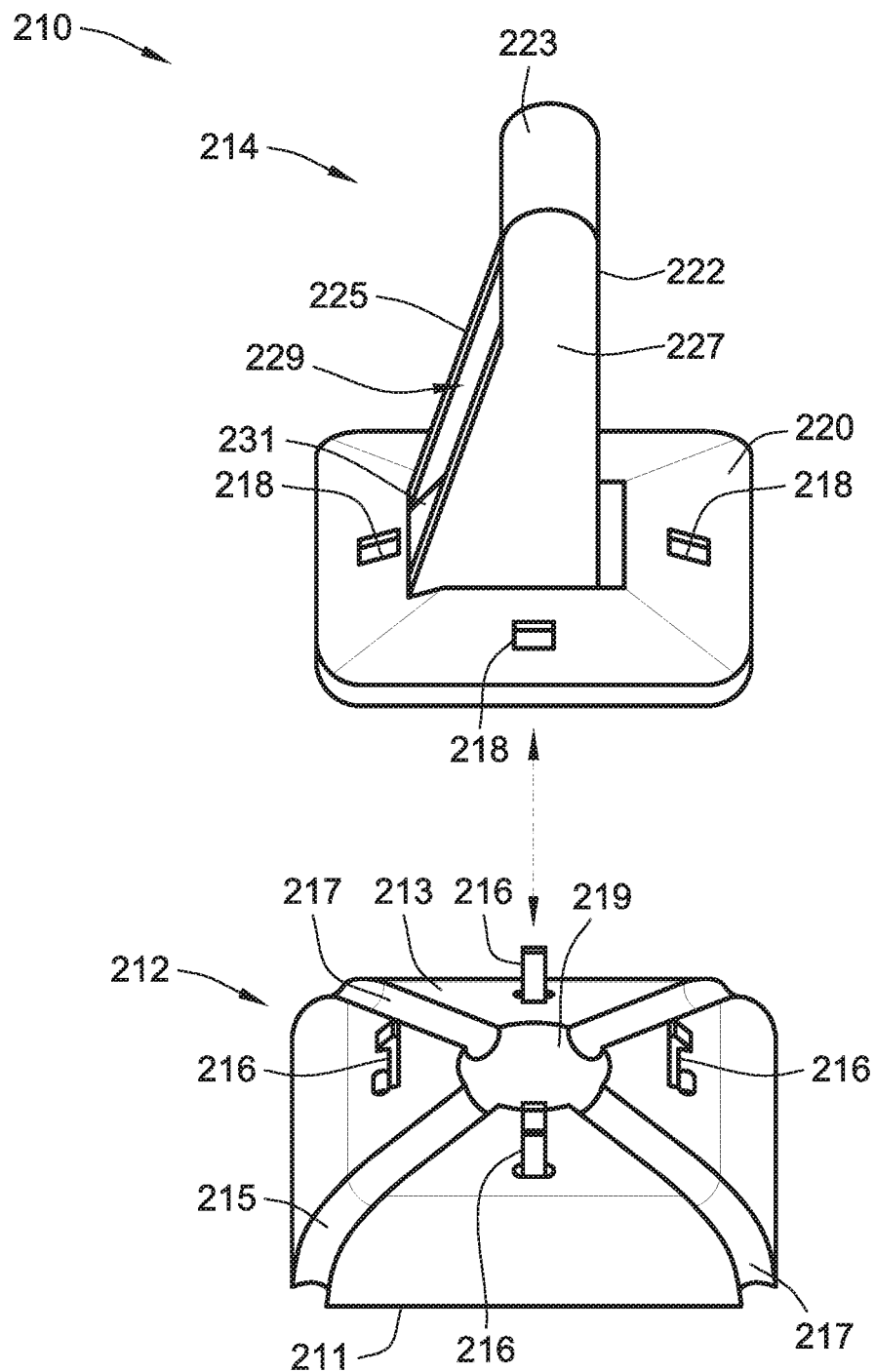
FIG. 4 is an exploded, perspective-view illustration of the representative passive-release, snap-fit coupling device of FIG. 3.

Seated on top of the container 201, the base plate 212 functions to secure the cargo mounting device 210 to the cargo container 201, e.g., for airlift and delivery via UAV 100. A bottom-most (first) surface 211 of the base plate 212 lies flush against a top surface of the container 201, while a top (second) surface 213 of the base plate 212 faces the hook latch 214. As best seen in FIG. 4, the base plate 212 has a truncated (frustum) pyramidal shape with rounded sidewalls and a square base. In FIG. 3, a wrapping wire 203 is wound around the end faces and/or side faces of the cargo container 201. This wrapping wire 203, which may take on the form of a string, twine, strap, thin-gauged cable, etc., is secured within one or more wire channels recessed into the base plate's top surface 213. For instance, a pair of open-faced wire channels—first and second mutually orthogonal wire channels 215 and 217, respectively—are shown arranged in a cruciform pattern on the top surface 213 of the base plate 212. Each recessed wire channel 215, 217 is shaped and sized to receive therein a respective segment of the wrapping wire 203; in so doing, the channels 215, 217 and wire 203 segments cooperatively affix the base plate 212 to the cargo container 201. Snap-fitting the hook latch 214 onto the base plate 212 functions to retain the wire 203 within the cargo mounting device 210.

The wrapping wire 203 may be wound around the cargo container 201 such that the wire segments crisscross at a right angle and meet at a wire intersecting point located on the top surface of the container 201. With the arrangement described in the preceding paragraph, the intersecting point of the wrapping wire 203 abuts the base plate 212, nested inside a semispherical central cavity 219 recessed into the base plate's top surface 213. The central cavity 219 of FIG. 4 is deeper and wider than the recessed wire channels 215, 217 to provide additional packaging space for the overlap thickness of the intersecting wire segments. When the cargo container 201 is lifted off the ground, the cargo mounting device 210 may lift away from container 201; the recessed wire channels 215, 217 are provided with downwardly sloping arcuate, concave shapes that extend across the base plate 212 such that the wrapping wire 203 maintains contact with the top surface 213 and to provide additional structural restraint for the wire 203, for example. Likewise, when the base plate 212 is inserted, the wrapping wire 203 is lifted away from the container 201; the arcuate top surface 213 and recessed wire channel 215, 217 help to ensure the wire is not separated from the base plate 212. In another aspect, just the recessed wire channels 215, 217 may have arcuate slopes while the top surface 213 may be flat.

With collective reference to both FIGS. 3 and 4, the hook latch 214 mechanically couples the cargo mounting device 210 to the tether cable 260 by way of tether hook 262. In FIG. 4, the hook latch 214 is depicted as a vertically oriented tower 222 that is mounted on top of a support plate 220. When the cable mounting device 210 is properly assembled, e.g., with the hook latch 214 mechanically coupled to the base plate 212 as described above, the support plate 220 sits directly against the base plate's top surface 213. As an optional alternative, the support plate 220 may be eliminated from the cargo mounting device 210 construction, for example, in configurations where the hook latch 214 is integral with the base plate 212. The hook latch tower 222 is an elongated structure with a back wall 221 (FIG. 3) that adjoins at a bottom (first) end thereof to the support plate 220 and at a top (second) end thereof to an arcuate overhang 223. Integral with the back wall 221 and overhang 223 is a pair of sidewalls, namely a left (first) sidewall 225 that projects generally orthogonally from a left (first) side of the back wall 221, and a right (second) sidewall 227 that is parallel to the left sidewall 225 and projects generally orthogonally from a right (second) side of the back wall 221. The sidewalls 225, 227 and back wall 221 extend perpendicularly from the support plate 220 and terminate at the arcuate overhang 223. It should be appreciated that the configuration, height, and/or width of the hook latch 214 may be scaled up or down, for example, to accommodate different hook configurations and desired packaging constraints. As shown, wrapping wire 203 is tangent to the latch tower 222, independent of package weight and associated sag; rounding the top end of the hook latch tower 222 may help to minimize stresses on the wire 203.

Figure 5:
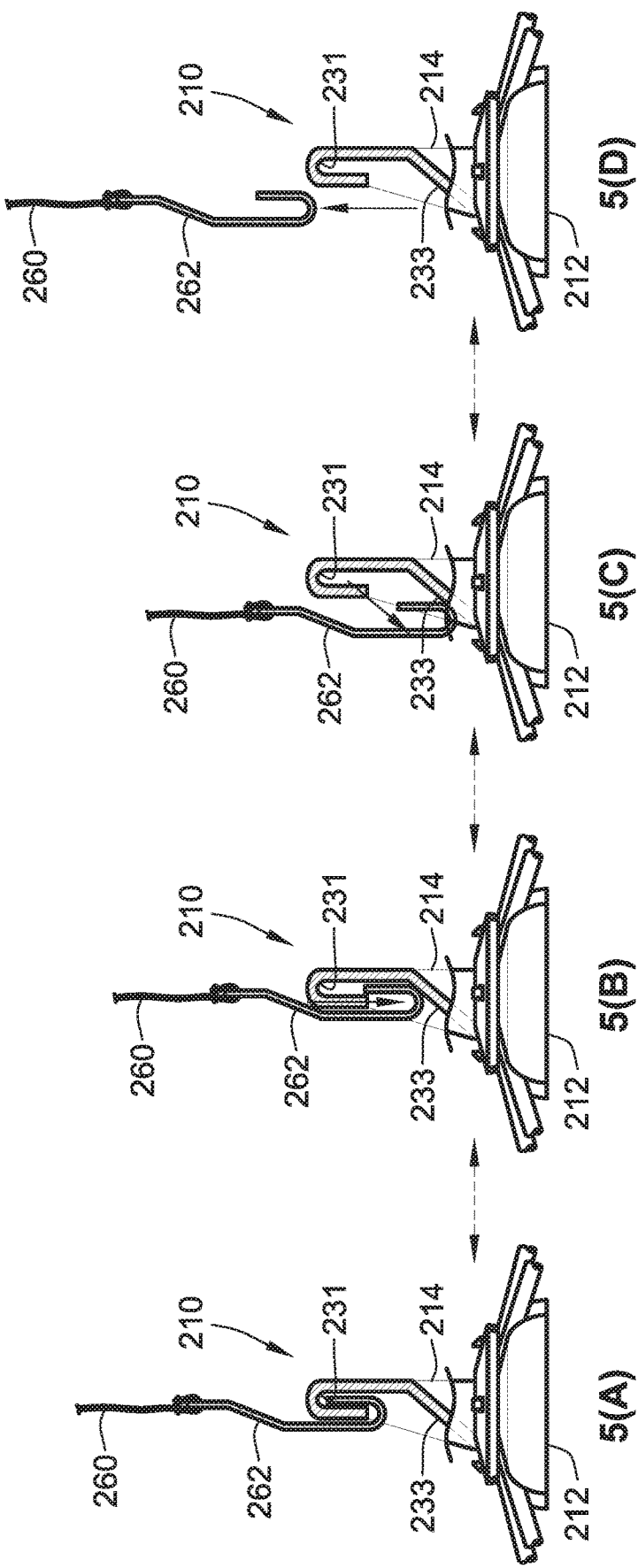
FIG. 5 is a workflow diagram illustrating a representative method of using the representative passive-release, snap-fit coupling device of FIGS. 3 and 4 to passively couple a cargo container to and passively decouple the cargo container from a tether hook of a cargo suspension system in accord with aspects of the disclosed concepts.

Projecting upward from the subjacent support plate 220, the hook latch tower 222 defines an internal pocket 229 that houses therein a catch cavity 231 (FIG. 5) and a guide surface 233. In particular, the catch cavity 231 is located at the upper end of the hook latch 214, defined between the arcuate overhang 223 and back wall 221. The guide surface 233, on the other hand, is sandwiched between the two sidewalls 225, 227, projecting at an oblique angle from the back wall 221 to the support plate 220. This inclined guide surface 233 is located underneath the catch cavity 231, ramping upwards and inwards from the support plate 220. As seen in FIG. 5, step 5(A), the tether hook 262 is received inside the catch cavity 231 to thereby mechanically mount the cargo mounting device 210 and, thus, the cargo container 201 on the tether cable 260.

To eject the tether hook 262 from the hook latch 214, the tether cable 260 is lowered, e.g., via electric winch 156, until the cargo container 201 rests on a subjacent support surface (not shown). When tension in the tether cable 260 is sufficiently reduced, the tether hook 262 will unseat from the catch cavity 231, as shown in step 5(B) of FIG. 5. Upon release from the catch cavity 231 due to the force of gravity, the tether hook 262 continues in a downward trajectory until it abuts and slides against the guide surface 233. Step 5(C) of FIG. 5 illustrates the tether hook 262 sliding diagonally downward and to the left, e.g., at approximately a 50-degree angle. The tether hook 262 thereafter lands against the support plate 220 at the bottom end of the guide surface 233. Now that the tether hook 262 has been ejected from the hook latch tower's 222 internal pocket 229, the hook 262 may be lifted upward and away, as seen in step 5(D). To reattach the tether hook 262 to the cargo mounting device 210, the operations portrayed in FIG. 5 may be performed in the opposite order, from 5(D) to 5(A). Put another way, the tether hook 262 follows the guide surface 233 as it is lowered, and is then ejectable once the hook 262 is cleared away from the pocket 229 at a predetermined distance such that the hook 262 does not catch the pocket 229 or the catch cavity 231 as it is pulled up.

Further, the disclosure comprises embodiments according to the following clauses:

Clause 1: an object mounting device for securing an object to and passively releasing the object from a tether hook suspended by an aircraft, the object mounting device comprising: a base plate configured to affix to the object; and a hook latch attached to the base plate, the hook latch including a catch cavity and a guide surface adjacent the catch cavity, the catch cavity being configured to receive therein the tether hook, and the guide surface being oriented at an oblique angle with respect to the base plate and configured to slidably engage the tether hook, wherein the catch cavity is configured to release the tether hook, under the force of gravity, such that the tether hook slides down the guide surface and thereby ejects from the hook latch.

Clause 2: the object mounting device of clause 1, wherein the hook latch includes an elongated tower mounted on a support plate, the tower including an internal pocket within which is located the catch cavity and the guide surface.

Clause 3: the object mounting device of clause 2, wherein the elongated tower includes a back wall adjoined at a first end thereof to and projecting from the support plate, and an arcuate overhang projecting from a second end of the back wall opposite the first end, and wherein the catch cavity is defined between the arcuate overhang and the back wall.

Clause 4: the object mounting device of clause 3, wherein the elongated tower further includes a first sidewall projecting from a first side of the back wall, and a second sidewall projecting from a second side of the back wall opposite the first side, and wherein the guide surface is sandwiched between the first sidewall and the second sidewall and projects obliquely from the back wall to the support plate.

Clause 5: the object mounting device of clause 2, wherein the hook latch, including the elongated tower and the support plate, is fabricated as a first single-piece structure.

Clause 6: the object mounting device of clause 1, wherein a wire is wrapped around the object, and wherein the base plate includes a first surface configured to seat against the object, a second surface opposite the first surface, and a wire channel recessed into the second surface and configured to receive therein the wire to thereby affix the base plate to the object.

Clause 7: the object mounting device of clause 6, wherein the wire channel has an arcuate concave shape extending across the base plate.

Clause 8: the object mounting device of clause 6, wherein the wire includes a first wire segment and a second wire segment, and wherein the wire channel includes a first channel configured to receive therein the first wire segment, and a second channel configured to receive therein the second wire segment.

Clause 9: the object mounting device of clause 8, wherein the first wire segment crisscrosses the second wire segment at an intersecting point, and wherein the first channel and the second channel are arranged in a cruciform pattern such that the intersecting point abuts the base plate.

Clause 10: the object mounting device of clause 9, wherein the first channel and the second channel intersect at a semispherical central cavity recessed into the base plate, and wherein the intersecting point of the first and second wire segments seats within the central cavity.

Clause 11: the object mounting device of clause 1, wherein the base plate is fabricated as a second single-piece structure.

Clause 12: the object mounting device of clause 1, wherein one of the hook latch and the base plate includes a plurality of snap apertures, and another of the hook latch and the base plate includes a plurality of cantilevered snap-fit tines each snap-locked into a respective one of the snap apertures to thereby mount the hook latch to the base plate.

Clause 13: an aircraft comprising: an airframe; a rotor assembly and/or a pair of wings attached to the airframe; a cargo suspension system attached to the airframe and including a tether cable with a tether hook coupled at one end of the tether cable; and a cargo mounting device including: a base plate configured to affix to a cargo container; and a hook latch mounted onto the base plate, the hook latch including a catch cavity and a guide surface adjacent the catch cavity, the catch cavity releasably receiving therein the tether hook, and the guide surface being oriented at an oblique angle with respect to the base plate and configured to slidably engage the tether hook, upon release from the catch cavity and under the force of gravity, to thereby eject the tether hook from the hook latch.

Clause 14: a method of securing an object to and passively releasing the object from a tether hook suspended by an aircraft, the method comprising: affixing a base plate to the object; mounting a hook latch to the base plate, the hook latch including a catch cavity and a guide surface adjacent the catch cavity, the guide surface being oriented at an oblique angle with respect to the base plate and configured to slidably engage the tether hook; receiving the tether hook in the catch cavity; and releasing the tether hook, under the force of gravity, from the catch cavity such that the tether hook slides down the guide surface, and thereby ejects from the hook latch.

Clause 15: the method of clause 14, wherein the hook latch includes an elongated tower mounted on a support plate, the tower including an internal pocket within which is located the catch cavity and the guide surface.

Clause 16: the method of clause 15, wherein the elongated tower includes a back wall adjoined at a first end thereof to and projecting from the support plate, and an arcuate overhang projecting from a second end of the back wall opposite the first end, and wherein the catch cavity is defined between the arcuate overhang and the back wall.

Clause 17: the method of clause 16, wherein the elongated tower further includes a first sidewall projecting from a first side of the back wall, and a second sidewall projecting from a second side of the back wall opposite the first side, and wherein the guide surface is sandwiched between the first sidewall and the second sidewall and projects obliquely from the back wall to the support plate.

Clause 18: the method of clause 14, further comprising wrapping a wire around the object, wherein the base plate includes a first surface configured to seat against the object, a second surface opposite the first surface, and a wire channel recessed into the second surface and configured to receive therein the wire to thereby affix the base plate to the object.

Clause 19: the method of clause 18, wherein the wire includes a first wire segment and a second wire segment, and wherein the wire channel includes a first channel configured to receive therein the first wire segment, and a second channel configured to receive therein the second wire segment.

Clause 20: the method of clause 19, wherein the first wire segment crisscrosses the second wire segment at an intersecting point, and wherein the first channel and the second channel are arranged in a cruciform pattern such that the intersecting point abuts the base plate.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An object mounting device for passively releasing an object from a tether hook suspended by an aircraft, the object mounting device comprising:
a base plate configured to affix to the object; and
a hook latch attached to the base plate, the hook latch including a catch cavity and a guide surface adjacent the catch cavity, the catch cavity being configured to receive therein the tether hook, and the guide surface being oriented at an oblique angle with respect to the base plate and configured to slidably engage the tether hook, the hook latch further including an elongated tower mounted on a support plate, the elongated tower including an internal pocket within which is located the catch cavity and the guide surface, the elongated tower further including a back wall and an arcuate overhang, the back wall adjoined at a first end thereof to and projecting from the support plate, and the arcuate overhang projecting from a second end of the back wall opposite the first end, the catch cavity being defined between the arcuate overhang and the back wall,
wherein the catch cavity is configured to release the tether hook, under the force of gravity, such that the tether hook slides down the guide surface and thereby ejects from the hook latch.

2. The object mounting device of claim 1, wherein the elongated tower further includes a first sidewall projecting from a first side of the back wall, and a second sidewall projecting from a second side of the back wall opposite the first side, and wherein the guide surface is sandwiched between the first sidewall and the second sidewall and projects obliquely from the back wall to the support plate.

3. The object mounting device of claim 1, wherein the hook latch, including the elongated tower and the support plate, is fabricated as a single-piece structure.

4. The object mounting device of claim 1, wherein a wire is wrapped around the object, and wherein the base plate includes a first surface configured to seat against the object, a second surface opposite the first surface, and a wire channel recessed into the second surface and configured to receive therein the wire to thereby affix the base plate to the object.

5. The object mounting device of claim 4, wherein the wire channel has an arcuate concave shape extending across the base plate.

6. The object mounting device of claim 4, wherein the wire includes a first wire segment and a second wire segment, and wherein the wire channel includes a first channel segment configured to receive therein the first wire segment, and a second channel segment configured to receive therein the second wire segment.

7. The object mounting device of claim 6, wherein the first wire segment crisscrosses the second wire segment at an intersecting point, and wherein the first channel segment and the second channel segment are arranged in a cruciform pattern such that the intersecting point abuts the base plate.

8. The object mounting device of claim 7, wherein the first channel segment and the second channel segment intersect at a semispherical central cavity recessed into the base plate, and wherein the intersecting point of the first and second wire segments seats within the central cavity.

9. The object mounting device of claim 1, wherein the base plate is fabricated as a single-piece structure.

10. The object mounting device of claim 1, wherein one of the hook latch and the base plate includes a plurality of snap apertures, and another of the hook latch and the base plate includes a plurality of cantilevered snap-fit tines each snap-locked into a respective one of the snap apertures to thereby mount the hook latch to the base plate.

11. An aircraft comprising:
an airframe;
a rotor assembly and/or a pair of wings attached to the airframe;
a cargo suspension system attached to the airframe and including a tether cable with a tether hook coupled at one end of the tether cable; and
a cargo mounting device including:
a base plate configured to affix to a cargo container; and
a hook latch mounted onto the base plate, the hook latch including a catch cavity and a guide surface adjacent the catch cavity, the catch cavity releasably receiving therein the tether hook, and the guide surface being oriented at an oblique angle with respect to the base plate and configured to slidably engage the tether hook, upon release from the catch cavity and under the force of gravity, to thereby eject the tether hook from the hook latch, the hook latch further including an elongated tower mounted on a support plate, the elongated tower including an internal pocket within which is located the catch cavity and the guide surface, the elongated tower further including a back wall and an arcuate overhang, the back wall adjoined at a first end thereof to and projecting from the support plate, and the arcuate overhang projecting from a second end of the back wall opposite the first end, the catch cavity being defined between the arcuate overhang and the back wall.

12. A method for passively releasing an object from a tether hook suspended by an aircraft, the method comprising:
affixing a base plate to the object;
mounting a hook latch to the base plate, the hook latch including a catch cavity and a guide surface adjacent the catch cavity, the guide surface being oriented at an oblique angle with respect to the base plate and configured to slidably engage the tether hook, the hook latch further including an elongated tower mounted on a support plate, the elongated tower including an internal pocket within which is located the catch cavity and the guide surface, the elongated tower further including a back wall and an arcuate overhang, the back wall adjoined at a first end thereof to and projecting from the support plate, and the arcuate overhang projecting from a second end of the back wall opposite the first end, the catch cavity being defined between the arcuate overhang and the back wall;
receiving the tether hook in the catch cavity; and
releasing the tether hook, under the force of gravity, from the catch cavity such that the tether hook slides down the guide surface, and thereby ejects from the hook latch.

13. The method of claim 12, wherein the elongated tower further includes a first sidewall projecting from a first side of the back wall, and a second sidewall projecting from a second side of the back wall opposite the first side, and wherein the guide surface is sandwiched between the first sidewall and the second sidewall and projects obliquely from the back wall to the support plate.

14. The method of claim 12, further comprising wrapping a wire around the object, wherein the base plate includes a first surface configured to seat against the object, a second surface opposite the first surface, and a wire channel recessed into the second surface and configured to receive therein the wire to thereby affix the base plate to the object.

15. The method of claim 14, wherein the wire includes a first wire segment and a second wire segment, and wherein the wire channel includes a first channel segment configured to receive therein the first wire segment, and a second channel segment configured to receive therein the second wire segment.

16. The method of claim 15, wherein the first wire segment crisscrosses the second wire segment at an intersecting point, and wherein the first channel segment and the second channel segment are arranged in a cruciform pattern such that the intersecting point abuts the base plate.

17. An object mounting device for passively releasing an object from a tether hook suspended by an aircraft, the object having wrapped therearound a wire with first and second wire segments crisscrossed at an intersecting point, the object mounting device comprising:
a base plate including a first surface configured to seat against the object, a second surface opposite the first surface, and a wire channel recessed into the second surface and configured to receive therein the wire to thereby affix the base plate to the object, the wire channel including a first channel segment configured to receive therein the first wire segment and a second channel segment configured to receive therein the second wire segment, the first and second channel segments being arranged in a cruciform pattern and intersecting at a semispherical central cavity recessed into the base plate such that the intersecting point of the first and second wire segments abuts the base plate and seats within the central cavity; and
a hook latch attached to the base plate, the hook latch including a catch cavity and a guide surface adjacent the catch cavity, the catch cavity being configured to receive therein the tether hook, and the guide surface being oriented at an oblique angle with respect to the base plate and configured to slidably engage the tether hook, the catch cavity being configured to release the tether hook, under the force of gravity, such that the tether hook slides down the guide surface and thereby ejects from the hook latch.

18. The object mounting device of claim 17, wherein the hook latch includes an elongated tower mounted on a support plate, the elongated tower including an internal pocket within which is located the catch cavity and the guide surface.

19. The object mounting device of claim 18, wherein the elongated tower includes a back wall adjoined at a first end thereof to and projecting from the support plate, and an arcuate overhang projecting from a second end of the back wall opposite the first end, and wherein the catch cavity is defined between the arcuate overhang and the back wall.

20. An object mounting device for passively releasing an object from a tether hook suspended by an aircraft, the object mounting device comprising:
a base plate configured to affix to the object; and
a hook latch attached to the base plate, the hook latch including a catch cavity and a guide surface adjacent the catch cavity, the catch cavity being configured to receive therein the tether hook, and the guide surface being oriented at an oblique angle with respect to the base plate and configured to slidably engage the tether hook, the catch cavity being configured to release the tether hook, under the force of gravity, such that the tether hook slides down the guide surface and thereby ejects from the hook latch,
wherein one of the hook latch and the base plate includes a plurality of snap apertures, and another of the hook latch and the base plate includes a plurality of cantilevered snap-fit tines, each of the cantilevered snap-fit tines being snap-locked into a respective one of the snap apertures to thereby mount the hook latch to the base plate.

21. The object mounting device of claim 20, wherein the hook latch includes an elongated tower mounted on a support plate, the elongated tower including an internal pocket within which is located the catch cavity and the guide surface.

22. The object mounting device of claim 21, wherein the elongated tower includes a back wall adjoined at a first end thereof to and projecting from the support plate, and an arcuate overhang projecting from a second end of the back wall opposite the first end, and wherein the catch cavity is defined between the arcuate overhang and the back wall.

\* \* \* \* \*